United States Patent [19]

Tek

[11] Patent Number: 5,052,856

[45] Date of Patent: Oct. 1, 1991

[54] METHOD FOR UNDERGROUND STORAGE OF GAS

[76] Inventor: M. Rasin Tek, 73-4329C Ahiahi St., Kailua-Kona, Hi. 96740

[21] Appl. No.: 565,934

[22] Filed: Aug. 13, 1990

[51] Int. Cl.$^5$ .............................................. B65G 5/00
[52] U.S. Cl. ....................................... 405/59; 405/53
[58] Field of Search ................... 405/53, 54, 55, 59, 405/210; 220/18

[56] References Cited

U.S. PATENT DOCUMENTS

| | | | |
|---|---|---|---|
| 703,824 | 7/1902 | Quinn | 405/59 X |
| 2,947,147 | 8/1960 | Johnson | 405/54 |
| 4,068,480 | 1/1978 | Lefever et al. | 405/59 |
| 4,190,072 | 2/1980 | Fernandez et al. | 405/59 X |
| 4,209,271 | 6/1980 | McCabe et al. | 405/210 |
| 4,247,220 | 1/1981 | Furman | 405/53 |

Primary Examiner—David H. Corbin
Attorney, Agent, or Firm—Harness, Dickey & Pierce

[57] ABSTRACT

A method for underground storage of a gas is disclosed in which the stored gas or top gas is physically separated from the cushion gas to avoid undesired intermixing of the two gases. This enables a less expensive cushion gas to be used resulting in a significant cost savings in the development and use of an underground storage cavern. The gas separation can be accomplished by dividing the cavern into two portions using a flexible membrane attached at its periphery to the walls of the cavern, installing a plurality of balloons inflated with the cushion gas in the cavern or inflating a single large bladder in the cavern with the cushion gas. With additional separation of the cavern into multiple portions, a plurality of gases can be simultaneously stored in a single cavern.

14 Claims, 4 Drawing Sheets

METHOD FOR UNDERGROUND STORAGE OF GAS

BACKGROUND AND SUMMARY OF THE INVENTION

The present invention relates to storage of a gas in an underground cavern. In storage, a portion of the gas remains in the underground cavern to supply the necessary pressure to withdraw the stored gas. That portion is called cushion gas. This invention is particularly related to a method of underground gas storage in which a substitute gas is used as the cushion gas.

With natural gas, underground storage is a method by which a constant supply from a natural gas pipeline is combined with a variable demand for the natural gas for an economic advantage. Because the natural gas consuming market is seasonal and critically fluctuates with the severity of weather, it is common practice to store the gas transported by pipelines in some underground storage environment during the summer and then retrieve the gas from the storage during winter when market demand exceeds the rate deliverable from the pipeline. The environment for storage is usually provided by depleted gas or oil fields, porous and permeable aquifers as well as underground cavities, mined or developed in salt domes by fresh water leaching.

The pressures maintained in storage fields cycle between a maximum value after injection of the gas at high inventory and a minimum value corresponding to a low inventory reached at the end of winter withdrawal. The maximum pressure is limited by the mechanical integrity of the cap rock and surface equipment while the minimum pressure is limited by the required gas deliverability from the storage field and structural circumstances related to cavern stability. It is well known in storage operations that the gas deliverability which must be maintained during "peak day" and/or "last day" of the season critically depends upon the remaining gas inventory as measured by the prevailing pressure. In practical terms, this simply means that a certain amount of natural gas must be maintained in the storage reservoir at all times just to pressure it sufficiently to sustain the minimum gas deliverability. In salt cavern storage some minimum gas pressure is also necessary in order to maintain the volume and the shape of the cavity and to prevent the roof from collapsing.

The gas which must be committed to underground storage and held therein is called the "cushion gas". The gas which is injected and withdrawn each season is called the "top gas".

Depending upon the type of storage site, as much as 30% to 60% of the maximum amount stored could be the cushion gas. In natural gas storage, the use of natural gas as a cushion gas can be extremely expensive. Use of a cheaper substitute as the cushion gas has been developed in aquifer storage or depleted gas or oil field storage. Nitrogen gas, which currently costs much less than the cost of natural gas, has been used as a cushion gas. In underground storage reservoirs operated in porous environments the nitrogen cushion gas is directly injected into the reservoir. In typical porous rock it can coexist with the top gas without excessive, undesired mixing. The amount of the substitute inert cushion gas used is limited by its tendency to mix with the natural gas and dilute the heating value of the storage gas. In actual field operations where inert nitrogen is partially used as a substitute cushion gas, it has not exceeded 20% of the total cushion gas. By increasing the amount of inert nitrogen used as a cushion gas in natural gas storage, substantial savings can be achieved.

It is an object of the present invention to provide a method of storing a gas underground while using a different gas for a majority of the cushion gas without undesired mixing of the gases.

It is an advantage of the present invention that when an expensive gas is stored in an underground cavern, by using a less expensive substitute cushion gas, substantial cost savings can be realized.

According to the present invention, the cushion gas is separated from the top gas by a flexible, gas impervious membrane to prevent intermixing of the cushion gas with the top gas. The invention is most easily carried out in a mined or leached cavern such as a salt cavern having a single relatively large enclosed void space. One way of separating the cushion gas from the top gas is to divide the cavern into two portions by attaching a flexible membrane to the cavern wall about its periphery. The lower portion is filled with the cushion gas while the upper portion of the cavern is filled with the top gas. Another way of providing the gas separation is to install a pipe extending down into the cavern and attaching to the end thereof a large bladder that is filled with the cushion gas. Depending upon the quantity of natural gas in the cavern, the bladder will either expand or contract. Another way of separating the two gases includes lowering an uninflated balloon into the cavern inflating the balloon with the cushion gas and releasing the balloon in the cavern. This process is repeated until a sufficient quantity of inflated balloons have been deployed into the cavern to provide the necessary cushion. Multiple gases can be stored simultaneously by dividing the cavern into a plurality of separated portions.

Further objects, features and advantages of the invention will become apparent from a consideration of the following description and the appended claims when taken in conjunction with the accompanying drawings.

DETAILED DESCRIPTION OF THE INVENTION

Figure 1:
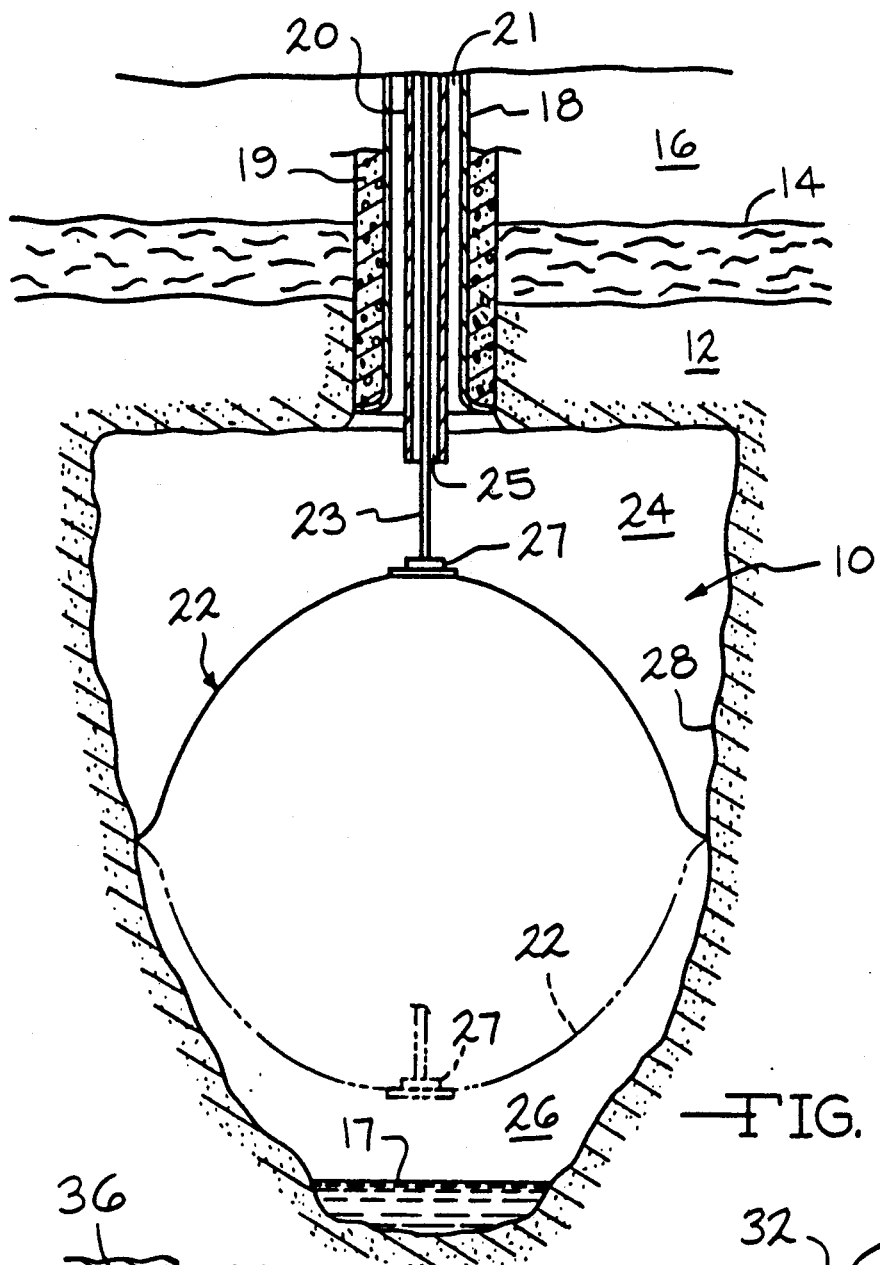
FIG. 1 is a sectional elevational view of a salt cavern equipped with a flexible membrane to separate the top gas from the cushion according to the present invention.

Underground storage of gas in a salt cavern according to the present invention is depicted in FIG. 1. The gas is being stored in a representative salt cavern 10 developed in the salt dome 12. In a typical geological formation the salt dome 12 is covered with a cap rock 14 that in turn is covered by an over burden formation 16. The cavern 10 is either developed by mining or more probably by leaching the salt using fresh water. A small pool 17 of saturated brine and other residue will remain at the bottom of cavern 10 from the leaching operation. The shape of cavern 10 shown in FIG. 1 approximates an inverted pear. This is one typical shape for a leached salt cavern. The shape of the cavern can be controlled to some extent by the leaching operation. Use of a blanket fluid during leaching permits development of a flat horizontal roof of the cavity.

Cavern 10 is accessed through an outer casing 18 that is firmly cemented to the cap rock 14 and salt dome 12 by concrete 19. An intermediate casing 20 extends through the outer casing 18 and is spaced therefrom forming an annular passage 21. A gas conduit 23 extends through the intermediate casing 20 forming another annular passage 25. Annular passages 21 and 25 can be used to inject and retrieve fluids during the development of the cavern and top gas during use of the cavern.

The separation of the top gas from the cushion gas within the cavern is accomplished by a flexible membrane 22 that is impervious to gas. Membrane 22 divides the cavern 10 into an upper portion 24 and a lower portion 26. The lower portion 26 of the cavern is filled with the substitute cushion gas, such as nitrogen, while the upper portion 24 is filled with a top gas, such as natural gas. The position of membrane 22 varies between the raised solid line position and the lowered broken line position shown in FIG. 1. As the membrane moves between these two extremes, the relative volumetric proportions of the cavern upper and lower portions 24 and 26 change.

The gas conduit 23 is connected to the membrane 22 through a filler valve assembly 27 fused to the membrane 22. The conduit 23 is used to fill the lower portion 26 with the cushion gas. Conduit 23 can be released from assembly 27 after a predetermined quantity of cushion gas has been injected into the cavern lower portion. Alternatively, the conduit 23 can be permanently secured to the membrane and retracted into and out of intermediate casing 20 as the membrane moves up and down.

The upper portion 24 of the cavern is filled with the top gas, such as natural gas, for storage during periods of low demand for the gas. The top gas is removed from the cavern during high demand for the gas when the pipeline deliverability is less than the current demand. With respect to natural gas as the top gas, at the end of the withdrawal season, i.e. winter, the majority of the natural gas will have been removed from the cavern such that the cushion gas will force the membrane 22 to the raised solid line position shown in FIG. 1. As the "top gas" is withdrawn and the cavern pressure drops, the nitrogen in the lower part of the cavern will expand and occupy a larger volume of the cavern. The pressure of cushion gas at all times will be only slightly different than the pressure of the top gas. When natural gas is subsequently injected into the cavern, the membrane 22 will be gradually forced by the top gas to the lower broken line position shown in FIG. 1. The membrane, separating the cushion gas from the top gas eliminates intermixing of the two gases that would dilute the natural gas and reduce its heating value. By providing the membrane 22, a substantial portion of the cushion gas in the cavern can be a less expensive gas, reducing the quantity of the top gas that must remain in the storage cavern.

The conceptual operation of gas storage in the salt cavern is shown in FIG. 1. It shows the salt cavity 10 divided into the upper and lower compartments by the flexible membrane 22 sealed around the periphery of the cavern to the cavern wall 28. The amount of cushion gas contained in the lower portion 26 is a fixed predetermined quantity. The volume of the cushion gas fluctuates with its pressure and the pressure of top gas immediately above the membrane in the upper portion 24. Whenever sufficient top gas is injected into the cavern and the pressure raised, the membrane 22 collapses to the lower position in FIG. 1 in which the cavern lower portion 26 is at a minimum volume. When the top gas is withdrawn from the cavern and the pressure drops, the membrane 22 rises back to its previous position shown by the solid line.

The membrane 22 can be made of polyvinyl chloride, polyethylene or similar reinforced elastomeric film that is flexible yet thick enough to withstand repeated inflation and deflation cycles and is impervious to the top gas and cushion gas contained within the cavern. The pressure differential on opposite sides of the membrane is relatively small. The membrane material must be capable of withstanding temperatures of up to approximately 200° F.

Figure 1B:
FIG. 1A, 1B and 1C are fragmentary sectional details illustrating three ways to attach the membrane of FIG. 1 to the cavern wall.
Figure 1C:
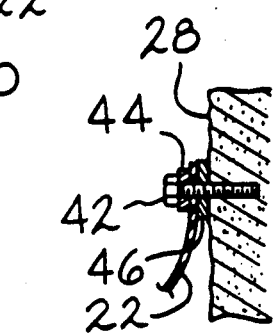
Figure 1A:
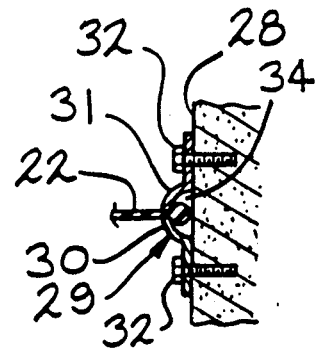

The membrane 22 can be attached to the cavern wall in one of several ways, three of which are shown in FIG. 1A-C. In FIG. 1A, a split ring 29 is used. Ring 29 is formed of lower member 30 and upper member 31 both secured to cavern wall 28 by screws 32 or similar fasteners. A suitable epoxy may also be used to secure the rings to the cavern wall. Ring 29 is formed of several small segments extending around the cavern. The segments are joined to one another by overlapping joints. Ring 29 forms a cavity 34 that retains a band at the periphery of membrane 22 while the membrane extends inwardly between the lower and upper members of split ring 29. After assembly, the edge of the membrane can be fused to the ring for seal.

An alternative attachment of the membrane 22 to cavern wall 28 is shown in FIG. 1B. With this attachment, the cavern wall 28 is grooved with a waterjet washed offset 36. The offset 36 forms a horizontal ledge into which screw bolts 38 are threaded to attach membrane 22. A gasket seal 40 may also be provided to assure a gas tight attachment of the membrane to the cavern wall.

A third attachment is shown in FIG. 1C in which screw bolts 42 are driven horizontally into the vertical cavern wall 28. Plate 44 is used to distribute the clamping load between bolts 42 and the seal 46 to form a gas tight assembly.

During initial filling of the cavern, it is recommended to inject the cushion and top gases simultaneously. This maintains a low or zero pressure differential across the membrane 22. Alternatively, the initial filling can begin with the cavern at atmospheric pressure and a membrane large enough that, prior to inflation, rests on the cavern walls and floor. The upper portion of the cavern is pressurized first pushing the membrane against the cavern walls. After a predetermined quantity of top gas is injected, the bottom portion is inflated with a predetermined quantity of cushion gas. The quantities of top and cushion gases are calculated to achieve a predetermined minimum storage pressure. Additional top gas is then injected to bring the cavern pressure up to the maximum storage pressure. This compresses the cushion gas, increasing its pressure and reducing its volume. This method also minimizes the pressure differential across the membrane.

The fluctuation in gas pressure within cavern 10 will cycle between the maximum pressure at peak inventory to a minimum gas pressure at the end of the winter withdrawal season. The minimum pressure is determined by the desired gas delivery rate and, depending on the type and depth of cavern and the structural integrity of its over burden, a minimum gas pressure may be required to prevent collapse of the cavern roof. The maximum pressure may be limited by the mechanical integrity of the cap rock or more often as a function of the depth of the cavity.

It can be seen from FIG. 1 that at the end of the withdrawal season, the upper portion 24 of the cavern still contains a quantity of the stored gas, now at a minimum pressure. This remaining stored gas is dedicated to the cavern and is therefore, strictly speaking, cushion gas. The proportion of the stored gas used as cushion gas relative to the substitute cushion gas is much less than in conventional underground gas storage where the substitute gas is limited between zero to no more than approximately 20%. Use of the membrane 22 to separate the substitute cushion gas from the stored gas makes it possible to use a greater amount of substitute cushion gas and thus provide a substantial cost saving.

Figure 2A:
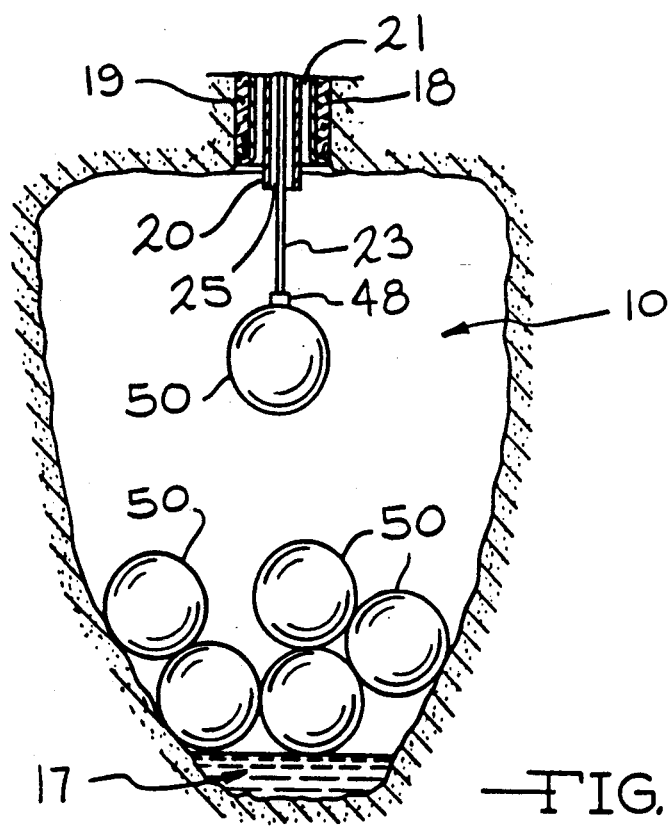
FIG. 2A is a sectional elevational view of a salt cavern similar to FIG. 1 with a plurality of inflated balloons to separate the top gas from the cushion gas shown with the storage gas at a minimum pressure.
Figure 2B:
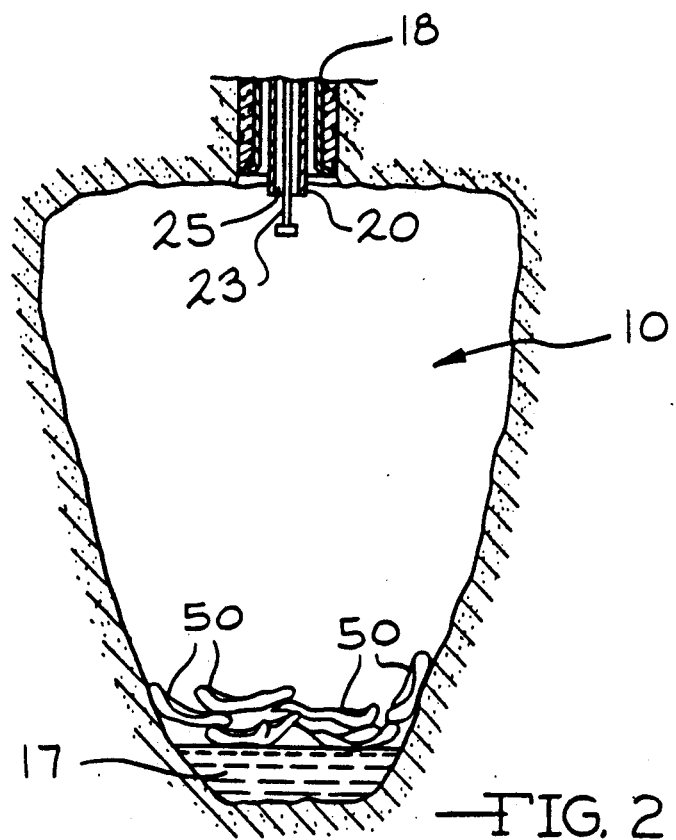
FIG. 2B is a sectional view of the salt cavern shown in FIG. 2A with the storage gas at a maximum storage pressure collapsing the cushion gas balloons.

On certain caverns, where human access into the cavern through casing 18 is not possible or practical, use of multiple in-situ inflated balloons to provide the minimum cushion gas pressure for the cavern may be more practical. This is shown in FIGS. 2A and 2B. Assembly 48 for inflating, sealing and releasing balloons 50 can be retracted and lowered into the cavern on the end of conduit 23. As many balloons 50 as are necessary to provide the necessary cushion can be installed in the cavern 10. When sufficient top gas is injected into the cavern and the pressure raised to maximum value, the balloons will collapse to a minimum volume as shown in FIG. 2B. When the top gas is withdrawn from the cavern and the pressure drops, the balloons will increase in size. The balloons are shown in FIG. 2A settled at the bottom of cavern 10. Their actual position in the cavern will depend upon the relative densities of the cushion and top gases. In normal operation of the storage cavity, they would settle at the bottom as nitrogen is about 1.6 times heavier than natural gas. As a matter of operating procedure, it is recommended that the cavern first be filled with top gas with the quantity of top gas that will remain in the cavern at the end of the withdrawal season. The balloons are then deployed in the cavern after being inflated with a predetermined quantity of the cushion gas. The desired quantities are determined based on the desired minimum pressure for the cavern and the ratio of top gas to cushion gas.

Figure 3:
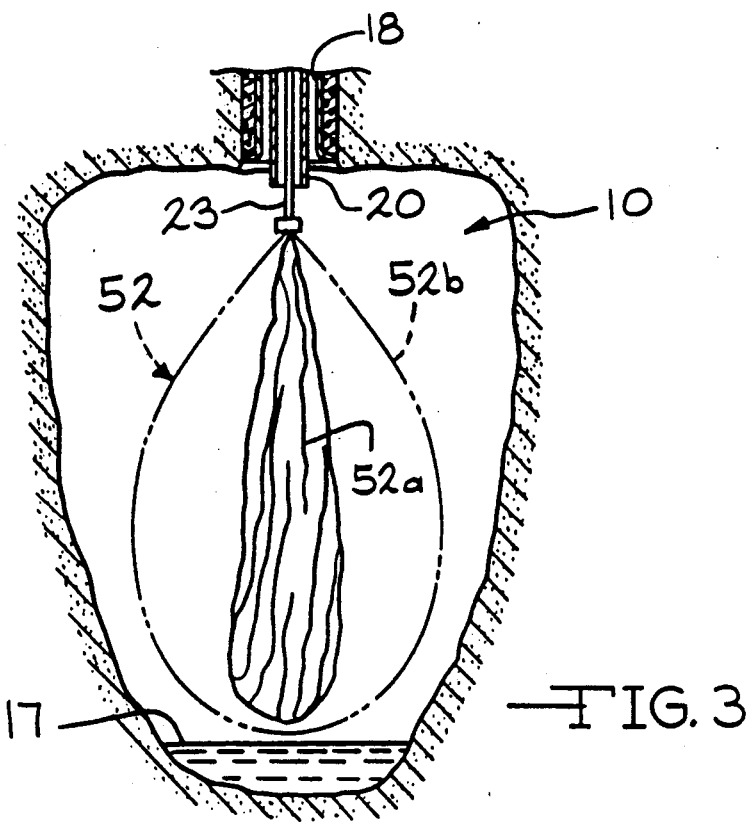
FIG. 3 is a sectional elevational view of a salt cavern similar to FIGS. 1 and 2 with a single bladder to separate the top gas from the cushion gas.

FIG. 3 discloses another system for separating the cushion gas from the top gas. In this embodiment a single bladder 52 is inserted into the cavern 10 at the bottom of conduit 23. Bladder 52 can be folded into a deployable container (not shown) for lowering it into the cavern. Once in the cavern, the bladder can be deployed and inflated with a predetermined quantity of a cushion gas. The bladder designated as 52a shows the cavern in the maximum inventory state of the top gas in which the bladder 52 is collapsed to a minimum volume. As the top gas is removed from the cavern, and the pressure reduced, the bladder 52 will expand in volume to the position designated 52b with a minimum top gas pressure. Again, storage is initiated by filling the cavern with a predetermined minimum quantity of top gas after which the bladder is inflated with a predetermined quantity of cushion gas.

The material for the inflatable bladder must be a foldable flexible material impervious to gas and capable of structural and elastic integrity in underground storage temperatures of up to about 200° F. Polyethylene film of sufficient thickness and preferably with nylon or other reinforcing materials would be satisfactory. The bladder, once inflated with a predetermined quantity of cushion gas is sealed. Although the bladder remains on the conduit 23 it is not intended that the quantity of the cushion gas will be increased or decreased during use of the cavern.

By physically separating the cushion gas from the top gas, a greater quantity of a less expensive inert gas can be used as the cushion gas then is currently possible. As a result, a smaller quantity of the stored gas, in most cases natural gas, will be dedicated to the cavern, significantly reducing the cost of creating and maintaining the underground gas storage facility.

Figure 4:
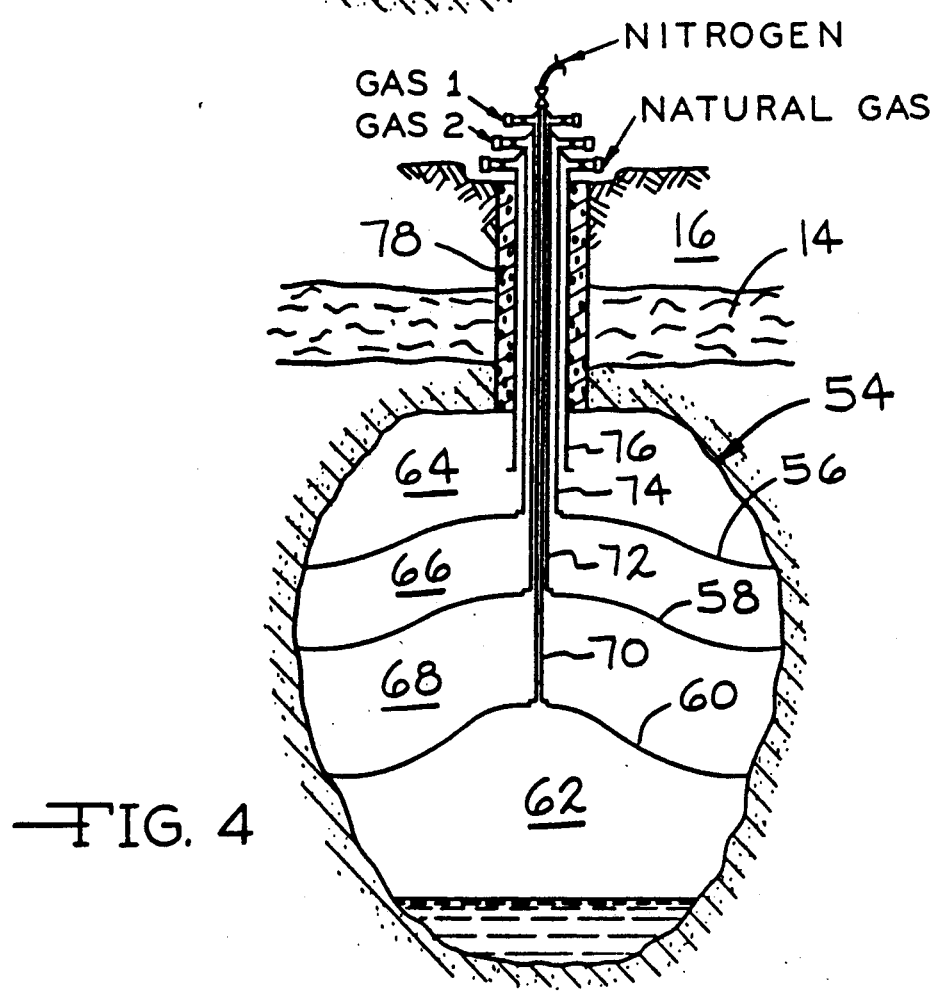
FIG. 4 is a sectional view of a salt cavern similar to that shown in FIG. 1 having three flexible membranes dividing the cavern into multiple portions for simultaneous storage of multiple gases.
Figure 5:
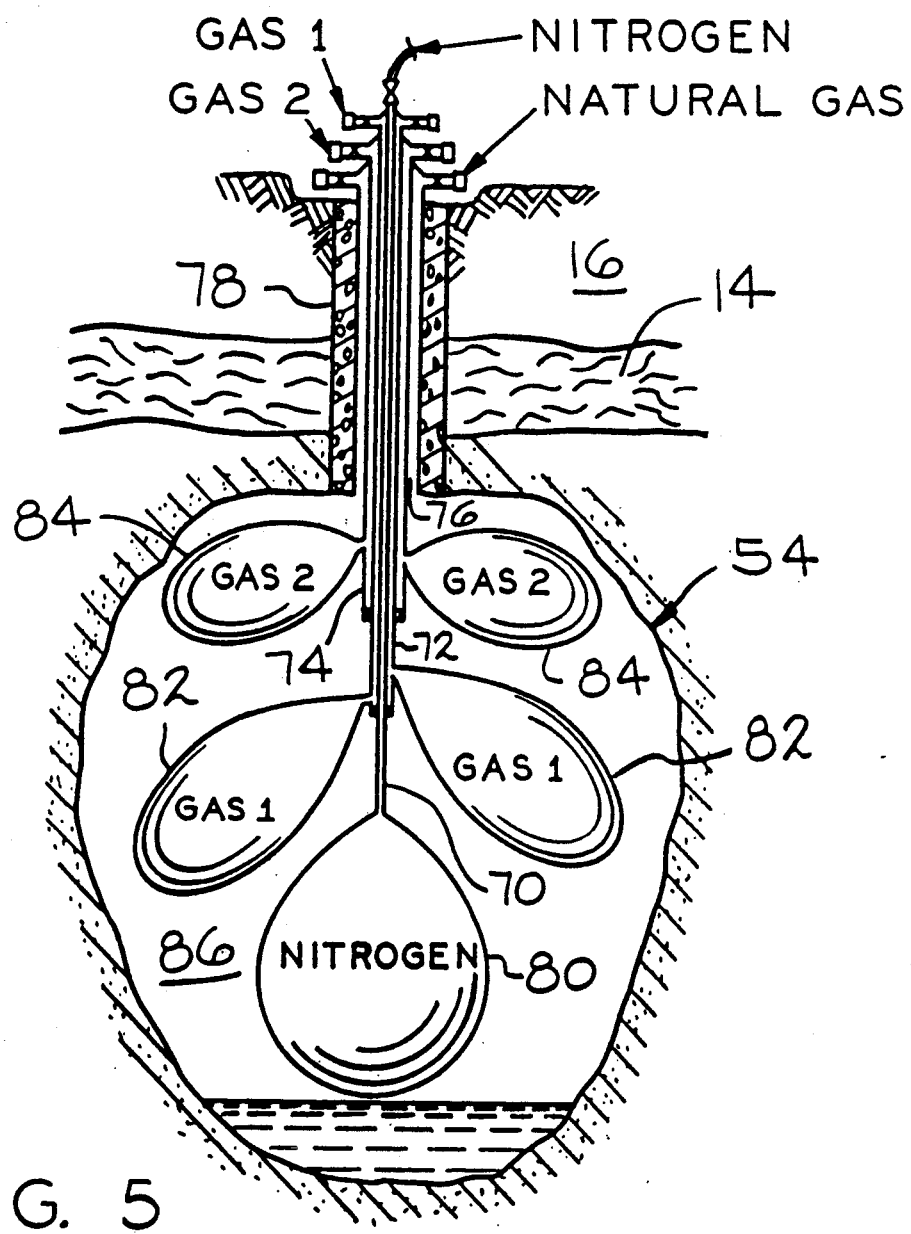
FIG. 5 is a sectional view of a salt cavern similar to that shown in FIG. 3 having multiple bladders for simultaneous storage of multiple gases.

FIGS. 4 and 5 disclose alternative embodiments enabling multiple gases to be simultaneously stored in the same cavern. Cavern 54 is divided into four separated portions by membranes 56, 58 and 60 connected about their peripheries to the wall of the cavern. The membranes are attached in a similar manner as disclosed in FIGS. 1A–C. The lower portion 62 of the cavern is used for the substitute cushion gases, such as nitrogen. The remaining cavern portions 64, 66 and 68 can be used to store three stored gases, for example, the upper portion 64 could contain natural gas while intermediate portions 68 and 66 may store other gases, gases 1 and 2. The natural gas would be injected and withdrawn cyclically as discussed above while the nitrogen is committed to be permanently present in the lower portion as a cushion gas. The other gases, gas 1 and gas 2, in the intermediate portions 66 and 68 would be injected and withdrawn as needed. Conduit 70, which is fused to membrane 60 is used to inject nitrogen, or other substitute cushion gas into the cavern. Conduit 72, which is fused to membrane 58 is used to inject and withdraw gas 1. Conduit 74 which is fused to membrane 56 is used to inject and withdraw gas 2. Outer casing 76, cemented to cap rock 14 by concrete 78, is used to inject and withdraw the natural gas or other top gas.

FIG. 5 shows a similar arrangement for storing multiple gases in which large bladders are used similar to that shown in FIG. 3 rather than the membranes shown in FIG. 4. In this embodiment, bladder 80 at the end of conduit 70 stores the nitrogen permanently dedicated to the cavern as substitute cushion gas. Bladders 82 are connected to the conduit 72 for storing gas 1 while bladders 84 connected to conduit 74 store gas 2. The remaining portion 86 of the cavern is used to store the primary top gas, such as natural gas. Again, the natural gas will be injected and withdrawn cyclically while gas 1 and gas 2 are injected and withdrawn as needed. In both the embodiments shown in FIGS. 4 and 5, the various gases are initially injected simultaneously so as to avoid significant pressure differentials acting upon the membranes or bladders.

It is to be understood that the invention is not limited to the exact construction or method illustrated and described above, but that various changes and modifications may be made without departing from the spirit and scope of the invention as defined in the following claims.

I claim:

1. A method of storing a storage gas in an underground cavern for later retrieval comprising the steps of:
   injecting into said cavern predetermined quantities of said storage gas and a substitute gas to produce a gas pressure above a minimum value at which said gas pressure forces gas to be delivered from said cavern at a given flow rate as desired for retrieval; and
   physically separating with flexible means said substitute gas from said storage gas to prevent undesired mixing of said substitute gas with said storage gas, said flexible means preventing retrieval of said substitute gas with said storage gas whereby said substitute gas serves as a cushion gas.

2. The method of claim 1 wherein said storage gas is natural gas.

3. The method of claim 2 wherein said substitute gas is nitrogen.

4. The method of claim 1 in which said separation is accomplished by installing in said cavern a flexible membrane by attaching the periphery of said membrane to the walls of said cavern.

5. The method of claim 1 wherein the injection of said substitute gas and separating of said gases is accomplished by inflating a plurality of balloons in said cavern with said substitute gas.

6. The method of claim 1 wherein the injection of said substitute gas and separating of said gases is accomplished by inflating a single flexible bladder in said cavern with said substitute gas.

7. A method of storing a storage gas in an underground cavern for later retrieval comprising the steps of:
   dividing said cavern into two portions with a flexible, gas impervious, membrane by attaching said membrane to the walls of said cavern;
   filling a first portion of said two cavern portions with a predetermined quantity of said storage gas;
   filling a second portion of said two cavern portions with a predetermined quantity of a second gas, said predetermined quantities of said gases being calculated to produce a desired minimum gas pressure within said cavern; and
   thereafter injecting additional storage gas into said first portion, increasing the pressure of the storage gas to a maximum storage pressure and compressing said second gas so as to reduce the volume of said second portion and increase the pressure of said second gas whereby said second gas provides the pressure to displace said storage gas from said cavern as desired for withdrawal of said storage gas.

8. The method of claim 7 wherein said storage gas is natural gas and said second gas is nitrogen gas.

9. The method of claim 7 further comprising the steps of:
   withdrawing a portion of said storage gas from said first portion, as desired; and
   alternately repeating the steps of injecting additional storage gas into said first portion and withdrawing a portion of said storage gas.

10. A method of storing a storage gas in an underground cavern for later retrieval comprising the steps of:
    injecting a predetermined quantity of said storage gas into said cavern;
    inflating within said cavern a plurality of balloons filled with a predetermined quantity of a first gas, said gas quantities being calculated to result in a minimum gas pressure within said cavern; and
    subsequently injecting additional storage gas into said cavern to a maximum storage pressure, compressing said first gas in said balloons so as to reduce the volume of said balloons whereby said first gas provides the pressure to displace said storage gas from said cavern as desired for withdrawal of said storage gas.

11. The method of claim 10 further comprising the steps of:
    withdrawing a portion of said storage gas from said cavern as desired; and
    alternately repeating the steps of injecting additional storage gas into said cavern and withdrawing a portion of said storage gas.

12. A method of storing a storage gas in an underground cavern for later retrieval comprising the steps of:
    disposing in said cavern an inflatable bladder, the interior of which is in communication with a gas conduit extending from said cavern;
    injecting a predetermined quantity of said storage gas into said cavern;
    inflating said bladder with a predetermined quantity of a first gas, said gas quantities being calculated to result in a minimum gas pressure within said cavern; and
    subsequently injecting additional storage gas into said cavern to a maximum storage pressure, compressing said first gas in said balloons so as to reduce the volume of said balloons whereby said first gas provides the pressure to displace said storage gas from said cavern as desired for withdrawal of said storage gas.

13. The method of claim 12 further comprising the steps of:
    withdrawing a portion of said storage gas from said cavern as desired; and
    alternately repeating the steps of injecting additional storage gas into said cavern and withdrawing a portion of said storage gas.

14. A method for simultaneously storing a plurality of gases in a storage cavern for withdrawal and injection as needed, comprising the steps of:
    dividing said cavern with flexible partition means into a number of portions equal to said plurality plus one;
    injecting predetermined quantities of storage gases into all but one of said cavern portions;
    injection into said remaining cavern portion a predetermined quantity of a cushion gas, the quantities of said gases being calculated to result in a minimum gas pressure within said cavern; and
    subsequently injecting additional quantities of said storage gases into said portions to increase the gas pressure in said cavern to a maximum storage pressure, compressing said cushion gas so as to reduce the volume of the portion containing said cushion gas whereby said cushion gas provides the pressure to displace said storage gases from said cavern as desired for withdrawal.

* * * * *